United States Patent [19]

Gutierrez et al.

[11] Patent Number: 4,866,135
[45] Date of Patent: * Sep. 12, 1989

[54] HETEROCYCLIC AMINE TERMINATED, LACTONE MODIFIED, AMINATED VISCOSITY MODIFIERS OF IMPROVED DISPERSANCY

[75] Inventors: Antonio Gutierrez, Mercerville; Robert D. Lundberg, Bridgewater, both of N.J.

[73] Assignee: Exxon Chemical Patents Inc., Linden, N.J.

[*] Notice: The portion of the term of this patent subsequent to Sep. 12, 2006 has been disclaimed.

[21] Appl. No.: 916,287

[22] Filed: Oct. 7, 1986

[51] Int. Cl.$^4$ .................. C08F 267/04; C08F 265/02; C08F 267/02

[52] U.S. Cl. .......................... 525/285; 44/63; 44/66; 44/70; 44/71; 252/51; 252/51.5 A; 252/56 R; 252/49.6; 252/56 D; 525/301; 560/196; 560/198; 564/159

[58] Field of Search .............. 525/285, 375, 301; 560/196, 198; 564/159

[56] References Cited

U.S. PATENT DOCUMENTS

| | | | |
|---|---|---|---|
| Re. 27,582 | 2/1973 | Kahn et al. | 252/32.7 E |
| 2,890,208 | 6/1959 | Young | 260/78.3 |
| 3,169,945 | 2/1965 | Hostettler et al. | 260/78.3 |
| 3,202,678 | 8/1965 | Stuart et al. | 260/326.5 |
| 3,219,666 | 11/1965 | Norman et al. | 260/268 |
| 3,236,917 | 2/1966 | Giancarlo et al. | 260/373 |
| 3,248,187 | 4/1966 | Bell | 44/63 |
| 3,284,417 | 11/1966 | Hostettler et al. | 260/78.3 |
| 3,316,177 | 4/1967 | Dorer, Jr. | 252/51.5 |
| 3,326,804 | 6/1967 | Hu | 252/34 |
| 3,381,022 | 4/1968 | LeSuer | 260/404.8 |
| 3,388,067 | 6/1968 | Brownawell et al. | 252/55 |
| 3,404,091 | 10/1968 | Brownawell et al. | 252/50 |
| 3,436,463 | 4/1969 | Mayhew et al. | 424/320 |
| 3,451,931 | 6/1969 | Furer et al. | 252/32.7 |
| 3,455,827 | 7/1969 | Mehmedbasich et al. | 252/32.7 |
| 3,493,568 | 2/1970 | Levy et al. | 260/244 |
| 3,522,179 | 7/1970 | LeSuer | 252/51.5 |
| 3,651,028 | 3/1972 | Maemoto et al. | 260/78.5 T |
| 3,687,849 | 8/1972 | Abbott | 252/47.5 |
| 3,687,905 | 8/1972 | Dorer | 260/78.4 D |
| 3,769,216 | 10/1973 | Gordon et al. | 252/51.5 R |
| 3,785,980 | 1/1974 | Wilgus | 252/51.5 A |
| 4,062,786 | 12/1977 | Brois et al. | 252/51.5 R |
| 4,086,294 | 4/1978 | Koleske et al. | 260/834 |
| 4,089,974 | 5/1978 | Engel et al. | 252/51.5 A |
| 4,132,531 | 1/1978 | Cummings et al. | 44/63 |
| 4,132,661 | 1/1979 | Waldbillig et al. | 252/51.5 A |
| 4,160,739 | 7/1979 | Stambaugh et al. | 252/34 |
| 4,169,063 | 9/1979 | Kiovsky | 252/51.5 A |
| 4,171,273 | 10/1970 | Waldbillig et al. | 252/51.5 A |
| 4,219,432 | 8/1980 | Girgenti et al. | 252/51.5 A |
| 4,234,435 | 11/1980 | Meinhardt et al. | 252/51.5 A |
| 4,261,871 | 4/1981 | Smith et al. | 260/18 EP |
| 4,292,184 | 9/1981 | Brois et al. | 252/46.3 |
| 4,362,635 | 12/1982 | Dhein et al. | 252/56 S |
| 4,379,914 | 4/1983 | Lundberg | 528/354 |
| 4,388,471 | 6/1983 | Wollenberg | 549/255 |
| 4,402,844 | 9/1983 | Trepka | 252/51.5 A |
| 4,415,728 | 11/1983 | Tremblay | 528/279 |
| 4,435,297 | 3/1984 | Fosberg | 252/34.7 |
| 4,450,281 | 5/1984 | Wollenberg | 549/255 |
| 4,463,168 | 7/1984 | Lundberg | 528/355 |
| 4,517,104 | 5/1985 | Bloch et al. | 252/51.5 A |
| 4,584,117 | 4/1986 | Wollenberg | 252/51.5 A |
| 4,585,566 | 4/1986 | Wollenberg | 252/51.5 A |
| 4,612,132 | 9/1986 | Wollenberg | 252/51.5 A |
| 4,614,603 | 9/1986 | Wollenberg | 252/51.5 A |
| 4,617,138 | 10/1986 | Wollenberg | 252/51.5 A |
| 4,624,681 | 11/1986 | Wollenberg | 44/63 |
| 4,645,515 | 2/1987 | Wollenberg . | |
| 4,647,390 | 3/1987 | Buckley, III et al. . | |
| 4,663,062 | 5/1987 | Wollenberg . | |
| 4,666,459 | 5/1987 | Wollenberg . | |
| 4,666,460 | 5/1987 | Wollenberg . | |
| 4,668,246 | 5/1987 | Wollenberg . | |
| 4,680,129 | 7/1987 | Plavac | 252/51.5 A |
| 4,741,848 | 5/1988 | Koch et al. . | |

FOREIGN PATENT DOCUMENTS 612320 1/1961 Canada .
202024 11/1986 European Pat. Off. .
1054370 1/1967 United Kingdom .

*Primary Examiner*—Edward J. Smith
*Attorney, Agent, or Firm*—R. A. Maggio; J. B. Murray, Jr.

[57] ABSTRACT

Polymer $C_5-C_9$ derivatives are made by reacting a $C_5-C_9$ lactone with an aminoalkyl derivative, e.g., N-(3-aminopropyl) morpholine, to form an adduct having a hydroxyl group on one end thereof and a tertiary amino nitrogen-containing heterocyclic ring group on the other end thereof, and then reacting the adduct with an ethylene-$C_3$ to $C_{28}$ alpha-olefin copolymer or terpolymer which has from about 0.2 to about 5 wt. % of ethylenically unsaturated carboxylic acid units grafted thereto, e.g., maleic anhydride ethylene-propylene copolymer. The resulting polymeric $C_5-C_9$ lactone derivatives are usful per se as multifunctional oil soluble additives for fuel and lubricating oil compositions, including concentrates containing the additives.

43 Claims, No Drawings

HETEROCYCLIC AMINE TERMINATED, LACTONE MODIFIED, AMINATED VISCOSITY MODIFIERS OF IMPROVED DISPERSANCY

RELATED U.S. APPLICATIONS

This application is related to the following applications filed by the inventors herein: Ser. No. 916,218; Ser. No. 916,114; Ser. No. 916,113; Ser. No. 916,108; Ser. No. 916,303 and Ser. No. 916,217. All of the above applications were filed on even date herewith. All of these related applications are expressly incorporated herein by reference in their entirety.

BACKGROUND OF THE INVENTION

1. Field of the Invention

This invention relates to polymeric dispersant additives for lubricating oils and hydrocarbon fuels. More particularly, this invention relates to substantially saturated copolymers comprising ethylene and one or more $C_3$ to $C_{28}$ alpha-olefin, preferably propylene, which has been grafted with an ethylenically unsaturated carboxylic acid material, and thereafter reacted with an adduct of a $C_5$–$C_9$ lactone and a polyfunctional amine which is terminated on one end by a primary or secondary amino group, and on the other end by a tertiary amine-containing heterocyclic ring group to produce a polymeric product having both ester and amide linkages and characterized by improved dispersant performance.

2. Prior Art

Polymeric dispersant additives based on olefin copolymer-unsaturated acid material adducts are well known in the art. These additives act to keep sludge and varnish dispersed in engine oils and have been used with commercial success.

It is also known to react such olefin copolymer-unsaturated acid material adducts with polyfunctional compounds such as polyamines, polyols, amino alcohols, and mixtures thereof to form multifunctional polymeric reaction products. These multifunctional products have been used as dispersant additives for lubricating oils and hydrocarbon fuels and as viscosity index improvers for lubricants.

It is also known that polymers of 6 to 10 membered lactones such as valerolactone or E-caprolactone can be prepared by reacting the lactone monomer with a hydroxyl or amine initiator. When reacting E-caprolactone, for example, the polymerization reaction may be illustrated by the following equations:

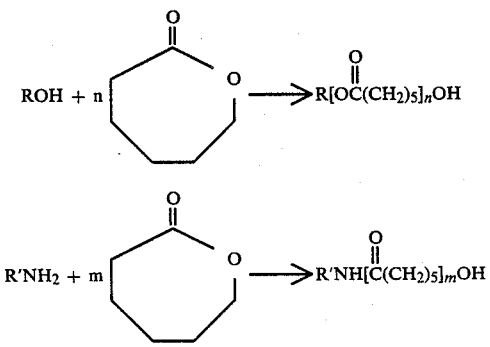

The reactions are known to be catalyzed by various esterification catalysts such as stannous octanoate, and a variety of different molecular weight products are feasible depending upon the ratio of lactone to initiator. Molecular weights on the order of from a few hundred up to about 5000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a polyamine to form a polyactone polymers which are terminated on one end by a tertiary amine group, and on the other end by a hydroxy group. Polyactone polymers of the type are useful for neutralizing certain sulfonic acid-containing polymers, such as lightly sulfonated polystyrene or sulfonated EPDM. The neutralized sulfonated polymers have a variety of applications such as viscosity modifiers for oils and surfactants. It has now been found that improved oil soluble dispersant additives, useful in fuel and lubricating oil compositions, including concentrates containing the additives, can be prepared by reacting an ethylene-alpha-olefin copolymer, which has been grafted by an ethylenically unsaturated carboxylic acid material, with an adduct of a $C_5$–$C_9$ lactone and a polyfunctional amine which is terminated on one end with a primary or secondary amino group, and on the other end with a tertiary amino group and/or a heterocyclic ring which upon reaction with the grafted ethylene copolymer produces an ester amide with improved varnish performance.

While there are a number of prior art disclosures relating to lactone polymerization and ring opening reactions, and to polymeric materials which incorporate nitrogen and/or oxygen and which exhibit dispersant and/or viscosity index improving characteristics, in general, little or no prior art of direct pertinance appears to have surfaced in regard to the present polymeric dispersant additives. Exemplary of the patent literature which relates to lactone ring opening and polymerization processes and/or to oil soluble acid grafted ethylene copolymer dispersant additives are the following U.S. Patents: U.S. Pat. No. 4,362,636 discloses synthetic ester oils which are esterification products of monoalcohols and dicarboxylic acids or of polyhydric alcohols and monocarboxylic acids respectively, containing 5 to 45% by weight of units of hydrocarboxylic acids obtained from aliphatic alcohols, aliphatic, cycloaliphatic or aromatic carboxylic acids, and lactones of aliphatic $C_5$–$C_{12}$ hydrocarboxylic acids. The synthetic ester oils are suitable for the preparation of lubricants and lubricant compositions.

U.S. Pat. No. 2,890,208 discloses a process for polymerizing lactones to form polyesters that are useful as plasticizers.

U.S. Pat. No. 4,062,786 and its continuation-in-part, U.S. Pat. No. 4,292,184, disclose lactone oxazoline reaction products of hydrocarbon substituted lactone carboxylic acids such as polybutyl lactone carboxylic acid, with a 2,2-disubstituted-2-amino-1-alkanol such as tris-(hydroxy-methyl) aminomethane (THAM). The reaction products and their derivatives are disclosed as being useful additives in oleaginous compositions such as sludge dispersants for lubricating oil.

U.S. Pat. No. 3,219,666 discloses as dispersing agents in lubricants, derivatives of polyalkenyl succinic acids and nitrogen compounds, including polyamines. The preferred molecular weight of the polyalkenyl moieties is 750–5000.

U.S. Pat. No. 4,379,914 and its continuation-in-part, U.S. Pat. No. 4,463,168, disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized, sulfonated derivatives which can be combined with an alkyl benzene sulfonic acid to give a surfactant which contains ester groups, hydroxyl groups and amine-neutralized sulfonate groups.

U.S. Pat. No. 3,316,177 teaches ethylene copolymers such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 4,169,063 discloses the reaction of an ethylene copolymer in the absence of oxygen and chlorine at temperatures of 150° to 250° C. with maleic anhydride followed by reaction with polyamine.

U.S. Pat. No. 4,132,661 teaches to graft an ethylene copolymer, using peroxide and/or air blowing, with maleic anhydride and then to react the grafted copolymer with a primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary amine group.

U.S. Pat. No. 4,171,273 discloses the reaction of an ethylene copolymer with maleic anhydride in the presence of a free radical initiator and then the reaction with mixtures of $C_4$ to $C_{12}$ n-alcohol and amine such as N-aminopropyl morpholine or dimethylamino propyl amine to form a V. I.-dispersant-pour depressant additive.

U.S. Pat. No. 4,219,432 teaches the reaction of maleic anhydride grafted ethylene copolymers with a mixture of an amine having only one primary group together with a second amine having two or more primary groups.

U.S. Pat. No. 3,169,945 discloses the preparation of lactone polyesters which are useful as plasticizers and as intermediates for preparing elastomers and forms. The polyesters can be prepared by reacting a lactone such as E-caprolactone with an initiator such as an alcohol, an amino alcohol, or an amine, including polyamines containing a heterocyclic ring group.

U.S. Pat. No. 3,436,463 relates to nematocidal and insecticidal compounds of N-substituted gamma hydroxycarboxylic acid amides. Among the disclosed compounds are the adduct of amines such as N-aminopropylmorpholine and gamma-butyrolactone or gamma-valerolactone.

U.S. Pat. No. 4,089,794 relates to polymeric dispersant additives comprising ethylene-alpha-olefin copolymers which have been solution grafted with an ethylenically unsaturated carboxylic acid material, and thereafter reacted with a polyfunctional material such as a polyamine, polyol or an amino alcohol.

U.S. Pat. No. 3,326,804 discloses improving the sludge dispersant properties of oleaginous compositions by adding thereto the reaction product of a polyalkylene polyamine with the product obtained by grafting maleic anhydride onto hydroperoxidized ethylene copolymer.

U.S. Pat. No. 3,404,091 discloses grafted polar monomers, such as acrylonitrole or methylacrylamide, onto hydroperoxidized copolymers of ethylene and propylene to produce multifunctional additives.

U.S. Pat. No. 3,687,849 relates to grafts of various unsaturated monomers including unsaturated polybasic acids, including maleic anhydride, onto a degraded, hydroperoxidized, interpolymers of ethylene and propylene (see also U.S. Pat. Nos. 3,388,067, 3,687,905 and 3,785,980).

U.S. Pat. No. 4,234,435 discloses as oil additives, polyalkylene substituted dicarboxylic acids derived from polyalkylenes having a $M_n$ of 1300 to 5000 and containing at least 1.3 dicarboxylic acid groups per polyalkylene. In Example 34 of this patent, a polyisobutene-substituted succinic acylating agent is reacted with caprolactam in the presence of mineral oil and sodium hydroxide.

U.S. Pat. No. 3,381,022 relates to ester derivatives of substantially saturated polymerized olefin-substituted succinic acid wherein the polymerized olefin substituuent contains at least about 50 aliphatic carbon atoms and host a molecular weight of about 700 to 5000. The esters include the acidic esters, diesters, and metal salt esters wherein the ester moiety is derived from monohydric and polyhydric alcohols, phenols and naphthols. The ester derivatives are disclosed to be useful as additives in lubricating compositions, fuels, hydrocarbon oils and power transmission fluids. A related application, i.e., U.S. Pat. No. 3,522,179, relates to lubricating compositions comprising a major amount of lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrogen substituent may be derived from a polymerized lower monoolefin having a molecular weight of from about 700 to about 5000.

U.S. Pat. No. 3,769,216 shows an atactic (i.e., noncrystalline) copolymer of ethylene and propylene containing from 45 to 65 mole percent of ethylene, mechanically degraded in the presence of oxygen followed by reaction with a polyamine.

U.S. Reissue Pat. No. 27,582 relates to oil additives derived from hydrocarbyl substituted succinic anhydride esters of N-hydroxyalkyl morpholines. A similar disclosure is contained in U.S. Pat. No. 4,435,297.

U.S. Pat. No. 3,651,028 is directed to copolymers of ethylene and maleic acid ester compounds which are modified by reaction with an amino alcohol such as a morpholine alcohol. The modified copolymers disclosed in this patent exhibit improved dye receptivity.

All of the above discussed patents are expressly incorporated herein by reference in their entirety.

Additional exemplary prior art disclosures, which are expressly incorporated herein by reference in their entirety are U.S. Pat. Nos. 4,402,844; 3,451,931; 3,248,187; 3,236,917; 3,202,678; 3,284,417; 3,455,827; 3,493,568; 4,086,294; 4,132,531; 4,261,871; 4,415,728; and 4,517,104.

SUMMARY OF THE INVENTION

Despite the efficacy of prior art dispersant and oleaginous compositions, there is a need for more efficient and less costly dispersants which can either perform better, or perform well at lower dispersant levels. Accordingly, it is a principal object of this invention to provide novel polymeric multifunctional additives which are effective, and readily prepared under typical manufacturing conditions.

Another object is to provide a novel class of multifunctional viscosity modifiers which contain ester and amide linkages.

Another object is to provide a process for preparing an efficient dispersant additive from a $C_5$–$C_9$ lactone, an ethylene-alpha-olefin copolymer which has been grafted with an ethylenically unsaturated acid material, and a polyamine compound.

A further object is to provide lubricant compositions and concentrates containing the novel polymeric dispersants of this invention.

Still another object is to provide metal complexes and other post-treated derivatives, e.g., borated derivatives of the novel dispersants of this invention, as well as lubricant compositions and concentrates containing such post-treated derivatives.

The manner in which these and other objects can be achieved will be apparent from the detailed description of the invention which appears below.

In one aspect of the invention, one or more of the above objects can be achieved by reacting an olefin copolymer, which has been grafted with an ethylenically unsaturated acid material, and an adduct of a $C_5$–$C_9$ lactone with a polyfunctional amine which is terminated on one end with a primary or secondary amino group and on the other end with a tertiary amino group and/or a nitrogen containing heterocyclic ring, to form multifunctional polymeric reaction products having utility as fuel and lubricating oil additives.

In another aspect, one or more of the objects of the invention can be achieved by heating a $C_5$–$C_9$ lactone such as E-caprolactone at a temperature of at least about 80° C. and preferably from about 90° C. to about 180° C. with a polyamine such as N-aminopropyl morpholine to form a lactone adduct which is terminated on one end by a hydroxyl group, and at the other end by a tertiary amine-containing heterocyclic ring group, and then heating the lactone adduct at a temperature of at least about 80° C., and preferably from about 90° C. to about 180° C. with a copolymer comprising ethylene and one or more $C_3$ to $C_{28}$ alphaolefin, preferably propylene, which copolymer has been grafted with an ethylenically unsaturated carboxylic material such as maleic anhydride; and, in a further aspect, one or more objects of this invention are achieved by providing novel polymeric dispersant additives produced by such a process.

One or more additional objects of this invention are achieved by reacting E-caprolactone with a polyamine to form an adduct containing both ester and amide linkages, and then reacting the caprolactone adduct with an ethylene-propylene copolymer which has been grafted with an ethylenically unsaturated carboxylic acid material, wherein the ethylene-propylene copolymer is characterized by a number average molecular weight of about 700 to about 500,000, one or more additional objects being accomplished by providing polymeric products produced by such a process.

One or more objects of this invention can be illustrated in connection with the reaction between E-caprolactone and N-aminopropl morpholine to form a lactone adduct, followed by the reaction of the lactone adduct with an ethylene-propylene-maleic anhydride graft copolymer to form a polymeric dispersant having both ester and amide linkages. This process can be characterized by the following general equations:

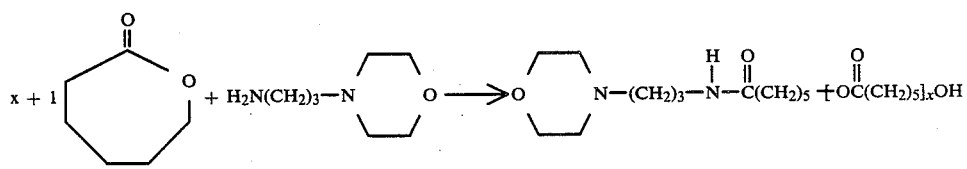

Eq. 3 where x = 0-10

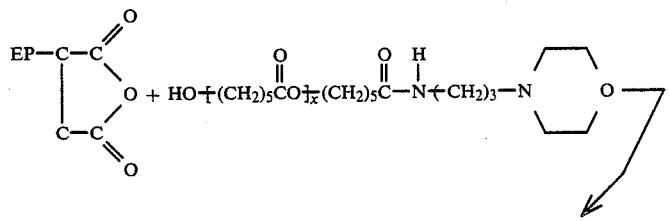

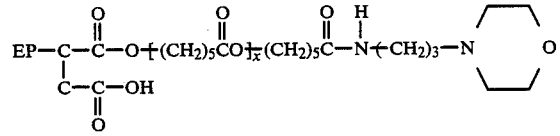

Eq. 4 where EP represents ethylene-propylene-copolymer having a number average molecular weight ($M_n$) of about 700 to about 500,000, and where the wt. % of maleic anhydride in the grafted ethylene-propylene copolymer is from about 0.01% to about 10%.

The stoichiometry of the above process can be controlled such that upon heating a diester is formed as follows:

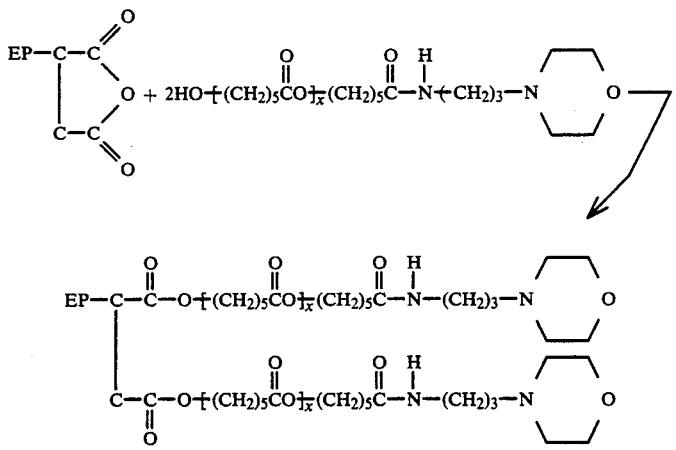

Eq.5

The novel polymeric ester-amide adducts of this invention are useful per se as an additive, e.g., a polymeric dispersant additive, for example, in the same manner as disclosed in U.S. Pat. No. 4,089,794 where prior art derivatives of acid grafted ethylene-alpha-olefin copolymers and nitrogen compounds are used as dispersant/detergents in lubricants, especially lubricants intended for use in the crankcase of internal combustion engines, gears, and power transmitting units. Accordingly, one or more objects of this invention are achieved by providing lubricating oil compositions, e.g., automatic transmission fluids, heavy duty oils suitable for use in the crankcases of gasoline and diesel engines, etc. containing the novel polymeric $C_5$–$C_9$ lactone derived adducts of this invention. Such lubricating oil compositions may contain additional additives such as viscosity index improvers, antioxidants, corrosion inhibitors, detergents, pour depressants, antiwear agents, etc.

DESCRIPTION OF THE PREFERRED EMBODIMENTS THE ETHYLENE COPOLYMER

The ethylene copolymers to be grafted in accordance with this invention contain from about 2 to about 98, preferably 30 to 80 wt. % of ethylene, and from about 2 to 98, preferably 20 to 70 wt. % of one or more $C_3$ to $C_{18}$, more preferably $C_3$ to $C_8$ alpha-olefins. Such copolymers preferably have a degree of crystallinity of less than 25 wt. %, as determined by X-ray and differential scanning calorimetry, and a number average molecular weight ($M_n$) in the range of about 700 to about 500,000, preferably 700 to 250,000, as determined by vapor phase osmometry (VPO) or membrane osmometry. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene; also branched chain alpha-olefins, such as 5-methylpentene-1 and 6-methylheptene-1 and mixtures thereof.

Terpolymers of ethylene, said alpha-olefin and a diolefin or mixtures of such diolefins may also be used. The amount of the diolefin ranges from 0 to about 20 mole percent, preferably up to about 7 mole percent, based on the total amount of ethylene and alpha-olefin present. Representatives diolefins include cyclopentadiene, 2-methylene-5-norbornene, hexadiene, or any other alicyclic or aliphatic diolefin having from 6 to 15 carbon atoms per molecule, such as 2-methyl or ethyl norbornadiene, 2,4-dimethyl-2-octadiene, 3-(2-methyl-1-propene) cyclopentene, ethylidene norbornene, etc.

These ethylene copolymers, this term including terpolymers, may be prepared using the well-known Ziegler-Natta catalyst compositions as described in U.K. Pat. No. 1,397,992.

Such polymerization may be effected to produce the ethylene copolymers by passing 0.1 to 15, for example, 5 parts of ethylene; 0.05 to 10, for example, 2.5 parts of said higher alpha-olefin, typically propylene; and from 10 to 10,000 parts of hydrogen per million parts of ethylene; into 100 parts of an inert liquid solvent containing (a) from about 0.0017 to 0.017, for example, 0.0086 parts of a transition metal principal catalyst, for example, $VOCl_3$; and (b) from about 0.0084 to 0.084, for example, 0.042 parts of cocatalyst, e.g., $(C_2H_5)_3Al_2Cl_3$; at a temperature of about 25° C. and a pressure of 60 psig for a period of time sufficient to effect optimum conversion, for example, 15 minutes to one-half hour; all parts being parts by weight.

THE ETHYLENICALLY UNSATURATED CARBOXYLIC ACID MATERIAL

The ethylenically unsaturated carboxylic acid materials which are grafted (attached) onto the copolymer are organic compounds which contain at least two carboxylic acid or its anhydride groups or a polar group which is convertible into said carboxyl groups by oxidation or hydrolysis. Maleic anhydride or a derivative thereof is preferred as it does not appear to homopolymerize appreciably but grafts onto the ethylene copolymer or terpolymer to give two carboxylic acid functionalities. Such preferred materials have the generic formula:

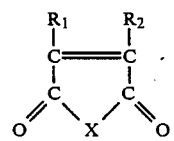   I wherein $R_1$ and $R_2$ are hydrogen or a halogen and X is oxygen, NH or $NR_3$ wherein $R_3$ is a hydrocarbly amine or alkyl group, e.g., a $C_1$ to $C_{40}$ alkyl, preferably $C_1$ to $C_{18}$ alkyl. Suitable examples include chloromaleic anhydride, itaconic anhydride, N-hexyl maleimide or the corresponding dicarboxylic acids, such as maleic acid or fumaric acid.

GRAFTING OF THE ETHYLENE COPOLYMER

The grafting of the ethylenically unsaturated acid material onto the ethylene copolymer backbone according to the process of this invention is carried out at an elevated temperature in the range of about 100° C. to 250° C., preferably 120° C. to 190° C. and more preferably 150° to 180° C., e.g., above 160° C., in a solvent, preferably a mineral lubricating oil solution containing e.g., 1 to 50, preferably 5 to 30 wt. %, based on the initial total oil solution, of the ethylene polymer and preferably under an inert environment. The grafting is carried out in the presence of a high-temperature decomposable compound capable of supplying free radicals at said elevated temperature.

The free radical initiators which may be used are peroxides, hydroperoxides, and azo compounds which have a boiling point greater than about 100° C. and decompose thermally within the grafting temperature range to provide said free radicals. Representative of these free-radical initiators are azobutyronitrile and 2,5-dimethyl-hex-3-yne-2,5-bistertiary-butyl peroxide, sold as Lupersol 130 by Wallace and Tiernan, Inc., or its hexene analogue. The initiator is used at a level of between about 0.005% and about 1% based on the total weight of the polymer solution.

The ethylenically unsaturated dicarboxylic acid material, e.g., maleic anhydride, is used in an amount ranging from about 5% to about 0.2% preferably 2.5 to .75%, based on the weight of the ethylene copolymer in the initial total oil solution. The aforesaid dicarboxylic acid material and free radical initiator are used in a weight percent ratio range of 1.0:1 to 30:1; preferably 2.0:1 to 5:1, more preferably 2.0:1 to 1.6:1. These ratios are the optimum ranges when using Lupersol 130. If other initiators are used, then the ratio should preferably be altered to give the same approximate number of moles of free radicals as with Lubersol 130 (which forms 4 moles free radicals per mole initiator).

The grafting is preferably carried out in an inert atmosphere, such as by nitrogen blanketing. While the grafting can be carried out in the presence of air, the yield of the desired graft polymer is decreased as compared to grafting under an inert atmosphere. The inert environment, which is preferred, should be free of oxygen, that is, preferably no substantial polymer oxidation should occur during the free-radical induced grafting of the polymer. No substantial oxidation is defined for the purposes of this invention as the introduction of less than about 0.05 wt. %, preferably less than about 0.01 wt. %, of oxygen into the grafted polymer excluding that introduced by the graft of said carboxylic acid material. The grafting time ranges from about 0.1 to 12 hours, preferably from about 0.5 to 6 hours, more preferably 0.5 to 3 hours. The graft reaction is carried out to at least approximately 4 times, preferably at least about 6 times the half-life of the free-radical initiator at the reaction temperature employed. Thus, for example, with Lubersol 130 about 2 hours is required at 160° C. and one hour at 170° C. (extrapolated from the vapor pressure); its half-life at 160° C. is 20 minutes, at 170° C., it is 8 minutes and at 180° C., it is 3 minutes. The time and temperature combination should be such that substantially all the peroxide (i.e., above 90%) is decomposed.

In the grafting process, the copolymer solution is first heated to grafting temperature and thereafter said dicarboxylic acid material and initiator are added with agitation although they could have been added prior to heating. When the reaction is complete, the excess maleic anhydride is eliminated by an inert gas purge, e.g., nitrogen sparging.

In the grafting step, the maleic anhydride or other dicarboxylic acid material used is grafted onto both the polymer and oil reaction solvent, the weight % grafted onto the polymer is normally greater than the amount grafted onto the oil due to greater reactivity of the polymer to grafting. However, the exact split between the two materials depends upon the polymer and its reactivity, the reactivity and type of oil, and also the concentration of the polymer in the oil. The split can be measured empirically from the infrared analyses of product dialyzed into oil and polymer fractions and measuring the anhydride peak absorbance in each. Typically, the amount of unsaturated carboxylic acid material grafted onto the ethylene copolymer is from about 5 to about 0.2 weight %, based on the weight of the grafted copolymer.

The grafting is preferably carried out in a mineral lubricating oil which need not be removed after the grafting step but can be used as the solvent in the subsequent reaction of the graft polymer with the polyfunctional material and as a solvent for the end product to form the concentrate.

THE LACTONE MATERIAL

Useful lactone compounds for forming the intermediates or lactone adducts by reaction with a polyamine compound include lactones having at least five carbon atoms in the lactone ring, e.g., 5 to 9 carbon atoms. The lactones may be substituted or unsubstituted and the substituents, if any, may comprise, for example, alkyl, aryl, aralkyl, cycloalkyl, alkoxy or other groups which would not interfere with the ring opening reaction and adduct formation. The preferred lactones have no more than two substituent groups, and the more preferred lactones are unsubstituted.

Non-limiting examples of the useful lactones include delta-valerolactone, methyl-delta-valerolactone, E-caprolactone, methyl-E-caprolactone, dimethyl-E-caprolactone, methoxy-E-caprolactone, cyclohexyl-E-caprolactone, methylbenzyl-E-caprolactone, caprylolactone, methyl-caprylolactone, and the like, with E-caprolactone being particularly preferred.

THE POLYAMINE COMPOUNDS

Useful polyamines for reaction with the $C_5$–$C_9$ lactone include polyamines of about 2 to 60, e.g., 3 to 20, total carbon atoms and about 2 to 12, e.g., 2 to 6 nitrogen atoms in the molecule, which amines are terminated on one end with a primary or secondary amino group and on the other end with a tertiary amine-containing heterocyclic ring group. The useful amines may be hydrocarbyl polyamines or may be hydrocarbyl polyamines including other groups, e.g., hydroxy groups, alkoxy groups, amide groups, imidazoline groups, and the like.

Preferred amines include aminoalkyl morpholines, such as N-(2-aminoethyl) morpholine, N-(3-aminopropyl) morpholine and the like where the alkyl group contains from about 2 to about 10 carbon atoms; and heterocyclic nitrogen compounds such as imidazolines and N-aminoalkyl piperazines of the general formula:

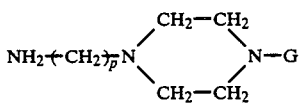

wherein G is hydrogen or an omega-aminoalkylene radical of from 1 to 3 carbon atoms and p is a number of from 1 to 4. Examples of such amines include 2-pentadecyl imidazoline, N-(2-aminoethyl) piperazine, N-(3-aminopropyl) piperazine, and N,N'-di-(2-aminoethyl) piperazine.

PREPARATION OF THE LACTONE ADDUCTS

The above lactones such as E-caprolactone are cyclic esters which can be reacted with a polyamine such as N-(3-aminopropyl) morpholine to yield hydroxyl terminated amide adduct structure containing a sequence of methylene units between the hydroxyl group and the amide group. In the case of E-caprolactone, which is a preferred lactone for use in this invention, the adduct contains a sequence of five methylene units between the hydroxyl and the amide groups (when the ratio of E-caprolactone to polyamine is 1:1) as follows:

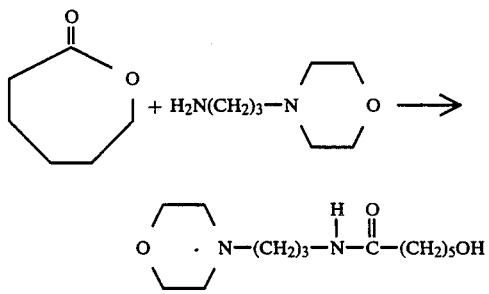

Eq. 6

When the ratio of E-caprolactone to polyamine is greater than one, e.g., 3:1, the adduct will also contain as ester sequence as follows:

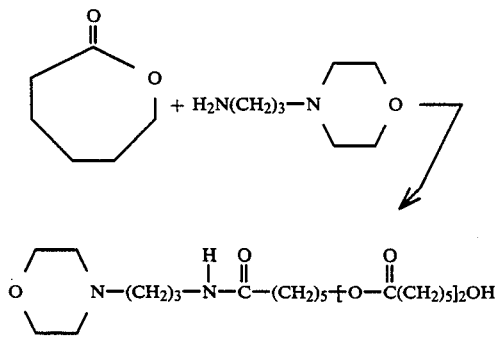

Eq. 7

It will be appreciated that the stoichiometry of the lactone and polyamine determines the length of the polyester sequence in the resulting adducts.

The chemistry of the lactone-polyamine reaction is such that primary amino-functionality is more reactive than the secondary amino functionality in the polyamine structure and therefore the amide structure illustrated in Equation 3 will be the favored product. It is also possible, however, that secondary amino functionality or the hydroxyl functionality of the resulting adducts can react with further molecules of the lactone to form a diversity of structures.

In the reactions discussed above, the degree of polymerization (DP) of the lactone monomer, i.e., the sequence of lactone units in a row in the lactone adduct, may vary depending upon the intended application. At DP's of much greater than about 10 the dispersants formed from the lactone adducts can exhibit crystallinity; a characteristic which is undesirable in an oil soluble dispersant due to the consequent high viscosity or even solid, oil products which can be obtained. However, at lower DP's oil soluble adducts possessing low viscosity and desirable sludge and varnish inhibition characteristics are obtained. Accordingly, regardless of the identity of the lactone adduct, the average degree of polymerization (DP) should be between about 0.2 and about 100, more preferably between about 0.2 and 50, and most preferably between 0.5 and about 20. For optimal dispersant performance sequences of from about 1 to about 5 lactone units in a row are preferred. The degree of polymerization can be controlled by controlling the reaction conditions, including the more ratio of lactone to polyamine compound, amount of catalyst employed, and the like. The polyamine is readily reacted with the lactone, with or without a catalyst, simply by heating a mixture of the lactone and polyamine in a reaction vessel in the absence of a solvent at a temperature of about 50° C. to about 200° C., more preferably to a temperature of about 75° C. to about 180° C., and most preferably at about 90° C. to about 160° C., for a sufficient period of time to effect reaction. Optionally, a solvent for the lactone, polyamine and/or adduct can be employed to control viscosity and or reaction rates.

Catalysts useful in the promotion of the above-identified lactone-polyamine reactions are selected from the group consisting of stannous octanoate, stannous hexanoate, stannous oxalate, tetrabutyl titanate, a variety of metal organic based catalyst acid catalysts and amine catalysts, as described on page 266, and forward in a book chapter authored by R. D. Lundberg and E. F. Cox entitled, "Kinetics and Mechanisms of Polymerization: Ring Opening Polymerization"; edited by Frisch and Reegan, published by Marcel Dekker in 1969, wherein stannous octanoate is an especially preferred catalyst. The catalyst is added to the reaction mixture at a concentration level of about 100 to about 10,000 parts by weight of catalyst per one million parts by weight of the total reaction mixture.

REACTING THE LACTONE ADDUCTS WITH THE GRAFTED ETHYLENE COPOLYMERS

The grafted polymeric solutions readily can be reacted with the lactone-polyamine adducts to form polymeric reaction products having both ester and amide linkages. The reaction can be carried out by mixing a solution of the grafted ethylene copolymer with the lactone-polyamine adduct, preferably in solution, and heating the resulting mixture, preferably in an inert atmosphere, at a temperature of from about 100° C. to 250° for from 10 minutes to 30 hours, preferably 10 minutes to 10 hours, usually about 15 minutes to about 3 hours.

While it is possible to use any amount of lactone-polyamine adduct that will be effective for producing the polymeric reaction products of this invention, it is typical to employ about 0.01 to about 10 moles of lactone-polyamine adduct per mole of grafted ethylene copolymer. However, it is preferred to use about 0.01 to about 5, more preferably about 0.5 to 2.5 moles per lactone-polyamine adduct per mole of grafted ethylene copolymer.

In one embodiment of the invention, the $C_5$–$C_9$ lactone adduct, which has been prepared by reacting E-caprolactone with N-(3-aminopropyl) morpholine, is reacted with an ethylene-propylene copolymer, which has been solution-grafted in the presence of a free-radical initiator with maleic anhydride, as outlined above. This reaction can be depicted generally by the equation:

cadmium, lead, silver, mercury, antimony and the like. Prior art disclosures of these complexing reactions may be found in U.S. Pat. Nos. 3,306,908 and Re. 26,433.

Post-treatment compositions include reacting the novel additives of the present invention with one or more post-treating reagents, usually selected from the group consisting of boron oxide, boron oxide hydrate, boron halides, boron acids, sulfur, sulfur chlorides, phosphorous sulfides and oxides, carboxylic acid or anhydride acylating agents, epoxides and episulfides

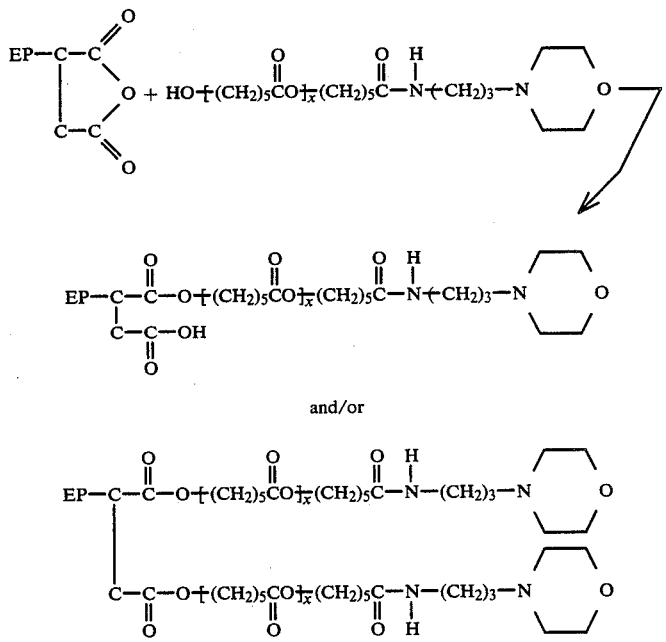

Eq. 8 where

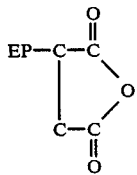

is ethylene-propylene copolymer of $M_n$ of about 700 to about 500,000, preferably 700 to 250,000 which has been grafted with about 0.01 to about 10 wt. %, preferably about 0.1 to about 0.8 wt. % maleic anhydride, and x is the number of ester units in sequence (in a row). It will be appreciated that the number of ester units in sequence, i.e., x, may vary, for example, between 0 and about 10.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten ruthenium, palladium, platinum, and acrylonitriles. The reaction of such post-treating agents with the novel additives of this invention is carried out using procedures known in the art. For example, boration may be accomplished in accordance with the teachings of U.S. Pat. No. 3,254,025 by treating the $C_5$–$C_9$ lactone derived additive compound with a boron oxide, halide, ester or acid. Treatment may be carried out by adding about 1–3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

THE COMPOSITIONS

The lactone derived additives of the present invention have been bound to possess very good dispersant properties as measured herein in a wide variety of environments.

Accordingly, the lactone derived adducts are used by incorporation and dissolution into an oleaginous material such as fuels and lubricating oils.

When the dispersants of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The lactone derived dispersants find their primary utility in lubricating oil compositions which employ a base oil in which the additives are dissolved is dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarbocarlic acids, polyglycols and alcohols; polyalphaolefins, alkyl benzenes, organic esters of phosphoric acids, polysilicone oils, etc.

Natural base oils include mineral lubricating oils which may very widely as to their crude source, e.g., whether paraffinic, naphthenic, mixed, parafinnic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cst. to 100° C.

The products of this invention can be employed in place of or in addition to, the viscosity modifier, for they can provide that function in addition to acting as very effective dispersants in the final formulations. The lactone-derived additives of this invention, therefore, are multifunctional viscosity modifiers.

Thus, the lactone derived additives of the present invention can be employed in a lubricating oil composition which comprises lubricating oil, typically in a major amount, and the lactone derived additives, typically in a minor amount, which is effective to impart enhanced dispersancy and enhanced viscosity modifying effect, relative to the absence of the additives. Additional conventional additives selected to meet the particular requirements of a selected type of lubricating oil composition can be included as desired.

The poylmeric dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.01 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, dispersants, anti-foaming agents, anti-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers or an unsaturated dicarboxylic acid and vinyl compound, interpolymers of styrene and acrylic esters, and styrene/isoprene copolymers.

Corrosion inhibitors, also known as anti-corrisive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum, fraction of a $C_2$ to $C_6$ olefin polymer such as polyisobutylene, with from 5 to 30 wt. % of a sulfide of phosphorus from ½ to 15 hours, at a temperature in the range of 150° to 600° F. Neutralization of the phosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in Y.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinic acid and mixtures thereof; U.S. Pat. No. 3,879,306 which discloses N-(hydroxyalkyl)alkenyl succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Dispersants maintain oil insolubles, resulting from oxidation during use, in suspension in the fluid thus preventing sludge flocculation and precipitation. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$-$C_{18}$ dialkylfumarate vinyl acetate copolymers, polymethacrylates, and wax naphthalene. Foam control can be provided by an antiformant of the polysiloxane type, e.g., silicone oil and polydimethyl siloxane.

Anti-wear agents, as their name implies, reduce wear of metal parts. Representatives of conventional anti-wear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 239,920, filed Aug. 23, 1988, which is a continuation of Ser. No. 32,066, filed Mar. 27, 1987 (now abandoned), which, in turn is continuation of Ser. No. 754,001, filed July 11, 1985 (now abandoned) the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Vol % | Wt % a.i. |
|---|---|---|
| Viscosity Modifier | .01–4 | .01–4 |
| Corrosion Inhibitor | 0.01–1 | .01–1.5 |
| Oxidation inhibitor | 0.01–1 | .01–1.5 |
| Dispersant | 0.1–7 | 0.1–8 |
| Pour Point Depressant | 0.01–1 | .01–1.5 |
| Anti-Foaming Agents | 0.001–0.1 | .001–0.15 |
| Anti-Wear Agents | 0.001–1 | .001–1.5 |
| Friction Modifiers | 0.01–1 | .01–1.5 |
| Detergents/Rust Inhibitors | .01–2.5 | .01–3 |
| Mineral Oil Base | Balance | Balance |

When other additives are employed, it may be desirable, although not necessary, to prepare additive concentrates comprising concentrated solutions or dispersions of the lactone-derived additive of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. The type and amount of the additional additives employed in an additive-package containing one or more of the lactone-derived additives of this invention will be dictated and controlled by the target viscosity of the additive-package. Thus, certain additional additives, such as corrosion inhibitors and oxidation inhibitors would typically not be employed in an additive-package containing the lactone-derived additives of this invention because of an undesirable increase in the viscosity of the additive-package which may occur and the associated need to add excessive amounts of base oil to compensate therefor. However, it is within the skill of the formulator, to achieve a suitable additive-package with viscosity compatible components.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following examples, wherein all parts are parts by weight and all molecular weights are number average molecular weight, unless otherwise noted and which include preferred emobdiments of the invention.

EXAMPLE 1

Preparation of Caprolactone-N-Aminopropyl Morpholine Adduct

About 144 g (1.0 g) of N-(3-aminopropyl) morpholine was mixed with 144 g (1.0 mole) of E-caprolactone in the presence of 0.1 of stannous octanoate and heated slowly to 140° C. under nitrogen atmosphere while stirring. The course of the reaction was observed by the disappearance of caprolactone by infrared analysis. At the end of the first hour at 140° C., the infrared spectrum showed complete conversion at the lactone to the corresponding hydroxyl terminated amide. The resulting adduct analyzed for 10.3% of N and a hydroxyl number of 114.7.

EXAMPLE 2-7

In a manner similar to the procedure of Example 1, E-caprolactone-N-(3-aminopropyl) morpholine adducts were prepared by reacting one mole of N-(3-aminopropyl) morpholine (NAPAM) with 2, 3, 4, 5, 10 and 20 moles of E-caprolactone.

EXAMPLES 8-9

Preparation of Ethylene-Propylene-Succinic Anhydride Caprolactone-Aminoalkyl Morpholine Adduct Part A:

An ethylene-propylene copolymer was made by the Ziegler-Natta process using $H_2$-moderated $VOCl_3$/aluminum sesquichloride catalyst. The copolymer had a crystallinity of less than 25%, contained about 44 wt. % of ethylene and 56 wt. % of propylene, had a thickening efficiency (T.E.) of 2.8 ($M_n$=75000). The T.E. is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 neutral) to a viscosity of 12.4 centistokes at 98.9° C., to the weight percent of a test copolymer required to thicken the same oil to the same viscosity at the same temperature. T.E. is related to $M_n$ and is a much more convenient, practical measurement. As a rough guide, a T.E. of 1.4 is about a $M_n$ of 33,800 while a T.E. of 2.80 is about a $M_n$ of 75,000; polymer type influences this relationship.

Part B:

About 100 lbs. of the ethylene-propylene copolymer (TE=2.8) prepared in Part A of this example were added to a masticator which had been preheated to 300° C. The temperature dropped to 137° C. While under a nitrogen atmosphere and with the masticator blades running at slow speed, the temperature gradually rose to 226° C. with the stage-wise addition of 1.0 lbs of t-dodecyl mercaptan. Thereafter, while the temperature rose to 226° C., 2.1 lbs. of maleic anhydride were added simultaneously with 1.2 lbs of a 0.2:0.7.3 weight ratio mixture of di-t-butyl peroxide, polyisobutylene ($M_n$=950), and Isopar m. This addition took about one half hour. While stirring with the blades at low speed, 425 lbs of solvent 100 neutral low pour oil were added over a period of 1.5 hours. The temperature dropped to 189° C. by the end of the dilution. Strong nitrogen sparging was maintained during the entire dilution period to remove all of the unreacted maleic anhydride. The resulting ethylene-propylene-succinic copolymer (EPSA) was analyzed for 0.2 meq/g of maleic anhydride grafted on the polymer and for 19% active ingredient.

Part C:

About 200 g. of the 19% active ingredient EPSA solution of Part B was diluted in S150N to make a 9 wt. % solution. The oil solution was heated to 150° C. and 3.9 g. of the adduct of Example 1 was added. The reaction mixture was then heated at 150° C. while sparging with nitrogen for 2 hours. The final product analyzed for 0.61 wt. % N.

EXAMPLE 9

Part A:

About 200 lbs. of the ethylene-propylene copolymer (TE=2.8) prepared in accordance with Part A of Example 8 were added to a masticator which was preheated to 190° C. The masticator temperature was maintained at 190° C. for 45 minutes while the copolymer was in the presence of air. The resulting oxidative sheared copolymer was degraded and was measured to have a TE of 1.4. The degraded copolymer was diluted to 20% active ingredient with solvent 100 neutral low pour oil (S100NLP).

Part B:

About 200 lbs. of a 2.0 wt % solution in S100NLP of the degraded copolymer prepared in Part A of this Example was heated to 190° C. under a nitrogen blanket. To this solution was added a mixture containing 0.55 lbs. of maleic anhydride and 0.25 lbs. of di-t-butyl peroxide in 1 lb. of S100N. This operation was repeated three more times at 10 minute intervals. The reaction mixture was then stripped with a nitrogen stream at 190° C. for 1.5 hours. The resulting 20% active ingredient EPSA was analyzed for 0.1 meq/g of maleic anhydride grafted on the degraded copolymer sample. The general procedure Part C, was then repeated, except that only 2 g of the adduct of Example 1 were added. The final product analyzed for 0.25 wt. % N.

EXAMPLE 10

(Control)

The procedure of Example 8 was repeated except that 1.15 g of NAPAM were used in Part C in place of the adduct of Example 1. The final product analyzed for 0.30 wt. % N. in the polyer.

Samples of the polymeric additives produced in Examples 8, 9 and 10 were subjected to a standard sludge inhibition bench test (SIB) and a standard varnish inhibition bench test (VIB).

The SIB and VIB tests forecast the performance of a lubricant in a gasoline engine. These tests are described below:

The SIB test employs a used crankcase mineral lubricating oil composition having an original viscosity of about 325 SUS at 37.8° C. that had been used in a taxicab driven generally for short trips only, thereby causing a buildup of a high concentration of sludge precursors. The oil that was used contained only a refined base mineral oil, a viscosity index improver, a pour point depressant and zinc dialkyl-dithiophosphate antiwear additive. The oil contained no sludge dispersants. The quantity of such used oil was acquired by draining and refilling the taxicab crankcase at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble particles thereby separating out. However, the supernatant oil still contains oil-soluble sludge precursors which under the conditions employed by this test tended to form additional oil-insoluble deposits of sludge. The sludge inhibiting properties of the additives being tested are determined by adding to portions of the used oil 0.8 wt. % on an active basis, of the particular additive being tested. Ten grams of each oil sample being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the oil by decanting supernatant oil and then carefully washing the sludge deposits with 15 ml. of pentane to remove all remaining oils from the sludge. The weight of the new solid sludge that forms in the test, in milligrams, is determined by drying the residue and weighing it. The results are reported hereinbelow as milligrams of sludge per ten grams of oil, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

Un the VIB test, a test sample consisting of ten grams of lubricating oil containing 0.8 wt. % on an active basis, of the additive being evaluated is used. The test oil is a commercial lubricating oil obtained from a taxicab after about 2,000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor is bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine tests which is described in ASTM Document for Multigrade Test Sequence for Evaluating Automotive Engine Oil, Sequence VD, Part C of STP 315 H.

Table I, which follows, summarizes the compositions tested and the test results:

TABLE 1

| Example | EP $M_n$[1] | SA | EPSA/NAPAM[2] | NAPAM/CL[3] | EPSA/NAPAM-CL[4] | wt. % N | SIB[5] | VIB[7] |
|---|---|---|---|---|---|---|---|---|
| 8 | 75,000 | | 0 | 1:1 | 1:2 | .61 | 14.5[6] | 2 |
| 9 | 33,800 | | 0 | 1:1 | 1:2 | .25 | 11.9[7] | 6 |
| 10 | 75,000 | 1:1 | 0 | 0 | 0 | | 8.9 | 5-6 |

[1] number average molecular weight of ethylene-propylene copolymer (EP)
[2] mole ratio of grafted ethylene-propylene copolymer (EPSA) to N—(3-aminopropyl) morpholine (NAPAM)
[3] mole ratio of N—(3-aminopropyl) morpholine to E-caprolactone in the NAPAM-CL adduct
[4] mole ratio of EPSA to NAPAM-CL adduct
[5] sludge inhibition bench test rating in milligrams sludge per 10 milligrams oil
[6] high sludge ratings due to insoluble particles present in oil
[7] varnish inhibition bench test rating on basis of to ; the higher the rating the greater the amount of varnish deposited.

The data in Table I indicate that additives prepared from prereacted adducts of E-caprolactone and an aminoalkyl morpholine, i.e., an amino alkyl derivative containing an amino group on one end of the derivative and a tertiary amine-containing heterocyclic ring on the other end thereof, react with an olefin copolymer-maleic anhydride adduct to produce a polymeric ester amide having improved varnish performance as compared to a similar olefin copolymer-maleic anhydride adduct reacted with the same aminoalkyl morpholine that was not prereacted with caprolactone.

As will be evident to those skilled in the art, various modifications on this invention can be made or followed, in light of the foregoing disclosure and illustrative examples, table and discussion, without departing from the spirit and scope of the disclosure or from the scope of the invention as set forth in the following claims.

What is claimed is:

1. A process for preparing polymeric dispersant additives for lubricating oils and hydrocarbon fuels, which comprises:

reacting a $C_5$–$C_9$ lactone at a temperature of from about 50° to about 200° C. with an aminoalkyl derivative having from 2 to about 60 total carbon atoms and from 2 to about 12 nitrogen atoms, said aminoalkyl derivative being terminated on one end thereof by a primary or secondary amino group and being terminated on the other end thereof with a tertiary amino-containing hetero-cyclic ring, to effect ring opening polymerization of said lactone and to form an adduct which contains a heterocyclic ring on one end and a hydroxyl group on the other end; and reacting said adduct at a temperature of from about 100° to about 250° C. for a period of from about 10 minutes to about 30 hours with a copolymer of ethylene and at least one $C_3$ to $C_{28}$ alpha-olefin, which copolymer has been grafted with an ethylenically unsaturated carboxylic acid material prior to being reacted with said adduct, to form an ester- and amide-containing polymeric dispersant reaction product having a degree of polymerization of said lactone of from about 0.2 to about 100 said ethylenically unsaturated dicarboxylic acid material being selected from the group consisting of organic compounds which contain at least two carboxylic acid groups or anhydride groups or a polar group which is convertible into said carboxylic acid groups by oxidation or hydrolysis.

2. The process of claim 1, wherein said ethylene copolymer has a number average molecular weight of from about 700 to about 500,000; and wherein there is from about 5 wt. % to about 0.2 wt. % of ethylenically unsaturated carboxylic acid derived units in the grafted ethylene-alpha olefin copolymer.

3. The process of claim 2, wherein said $C_5$-$C_9$ lactone is E-caprolactone.

4. The process of claim 2, wherein said $C_3$ to $C_{28}$ alpha-olefin comprises propylene.

5. The process of claim 2, wherein said ethylenically unsaturated carboxylic acid material is selected from group of materials having the formula:

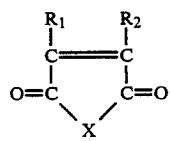

where $R_1$ and $R_2$ are hydrogen or a halogen, and X is oxygen, NH, or $NR_3$ wherein $R_3$ is a hydrocarbyl amine or a $C_1$-$C_{40}$ alkyl group.

6. The process of claim 2, wherein said ethylenically unsaturated carboxylic acid material is selected from the group consisting of chloromaleic anhydride, itaconic anhydride, N-hexyl maleimide, maleic anhydride, and the corresponding dicarboxylic acids thereof.

7. The process of claim 6, wherein said ethylenically unsaturated carboxylic acid material is maleic anhydride.

8. The process of claim 5, wherein said $C_5$-$C_9$ lactone is E-caprolactone, and wherein said ethylene copolymer is selected from ethylene-propylene copolymers containing from about 2 to about 98 wt. % ethylene moieties and from about 2 to about 98 wt. % propylene moieties and ethylene-alpha-olefin-non-conjugated diolefin terpolymers containing from about 2 to about 98 wt. % ethylene, from about 2 to about 98 wt. % of at least one $C_3$-$C_{28}$ alpha-olefin, and up to about 20 mole % of said non-conjugated diolefin, based on the total weight of ethylene and alpha-olefin moieties present.

9. The process of claim 1, wherein said aminoalkyl derivative is selected from the group consisting of aminoalkyl morpholines and heterocyclic nitrogen compounds of the general formula:

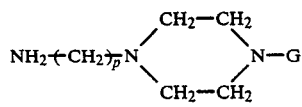

wherein G is hydrogen or an omega-aminoalkylene radical of from 1 to 3 carbon atoms, and p is a number of from 1 to 4.

10. The process of claim 5, wherein said aminoalkyl derivative is selected from the group consisting of aminoalkyl morpholines and heterocyclic nitrogen compounds of the general formula:

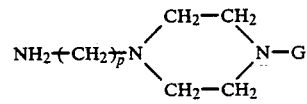

wherein G is hydrogen or an omega-aminoalkylene radical of from 1 to 3 carbon atoms, and P is a number of from 1 to 4.

11. The process of claim 10, wherein said $C_5$-$C_9$ is E-caprolactone, and wherein said ethylene copolymer is selected from ethylene-propylene copolymers containing from about 2 to about 98 wt. % ethylene moieties and from about 2 to about 98 wt. % propylene moieties and ethylene-alpha-olefin-non-conjugated diolefin terpolymers containing from about 2 to about 98 wt. % ethylene, from about 2 to about 98 wt. % of at least one $C_3$-$C_{28}$ alpha-olefin, and up to about 20 mole % of said non-conjugated diolefin, based on the total weight of ethylene and alpha-olefin moieties present.

12. The process of claim 5, wherein a molar excess of said $C_5$-$C_9$ lactone is reacted with said aminoalkyl derivative to form an adduct which contains an ester sequence between the terminal hydroxyl group and the terminal heterocyclic ring.

13. The process of claim 9, wherein a molar excess of said $C_5$-$C_9$ lactone is reacted with said aminoalkyl derivative to form an adduct which contains an ester sequence between the terminal hydroxyl group and the terminal heterocyclic ring.

14. The process of claim 8, wherein a molar excess of said $C_5$-$C_9$ lactone is reacted with said aminoalkyl derivative to form an adduct which contains an ester sequence between the terminal hydroxyl group and the terminal heterocyclic ring.

15. The process of claim 13, wherein said $C_5$-$C_9$ lactone is E-caprolactone, wherein said aminoalkyl derivative is an N-aminoalkyl morpholine having from 1 to about 10 carbon atoms in the alkyl group.

16. The process of claim 13, wherein said $C_5$-$C_9$ is E-caprolactone, wherein said aminoalkyl derivative is an N-aminoalkyl morpholine having from 1 to about 10 carbon atoms in the alkyl group.

17. The process of forming a polymeric dispersant additive for lubricating oils and hydrocarbon fuels, which comprises the steps of:

(a) forming a copolymer of ethylene and at least one $C_3$-$C_{28}$ alpha-olefin and, optionally, a non-conjugated diolefin, wherein said copolymer comprises from 2 to about 98 wt. % of ethylene moieties, from 2 to about 98 wt. % alpha-olefin moieties, and up to about 20 mole % of non-conjugated diolefin moieties;

(b) grafting onto the copolymer formed in step (a) from about 0.2 wt. % to about 5 wt. % of an ethylenically unsaturated carboxylic acid material, said acid material being selected from the group consisting of organic compounds which contain at least two carboxylic acid groups or anhydride groups or a polar group which is convertible into said carboxylic acid groups by oxidation or hydrolysis;

(c) reacting a $C_5$-$C_9$ lactone with an aminoalkyl derivative having from 2 to about 60 total carbon atoms and from 2 to about 12 nitrogen atoms at a temperature of from about 50 to about 200° C. to effect ring opening polymerization of said lactone and to form an adduct which is terminated at one end thereof with a hydroxyl group and at the other end with a nitrogen-containing heterocyclic ring, said aminoalkyl derivative being terminated at one end thereof with a primary or secondary amino group and at the other end thereof with a nitrogen-containing heterocyclic ring, and said adduct having a degree of polymerization of said lactone of from about 0.2 to about 100; and (d) reacting the adduct formed in step (c) with the grafted ethylene-alpha-olefin copolymer formed in step (b) at a temperature of from about 100° to about 250° C. to form a polymeric dispersant additive exhibiting improved varnish performance, the amount of said adduct being reacted in step (d) being from about 0.01 to about 10 moles of adduct per mole of grafted ethylene-alpha-olefin copolymer.

18. The process of claim 17, wherein said $C_3$–$C_{28}$ alpha-olefin comprises propylene; wherein said ethylenically unsaturated dicarboxylic acid material is a material selected from the group consisting of materials having the formula:

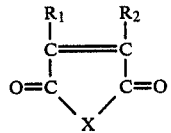

wherein $R_1$ and $R_2$ are hydrogen or a halogen, and X is oxygen, NH or $NR_3$ wherein $R_3$ is a hydrocarbyl amine or a $C_1$–$C_{40}$ alkyl group; wherein said $C_5$–$C_9$ lactone is E-caprolactone; and wherein said aminoalkyl derivative is selected from the group consisting of aminoalkyl morpholines and heterocyclic nitrogen compounds of the general formula:

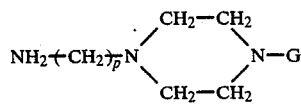

wherein G is hydrogen or an omega-aminoalkylene radical of 1 to 3 carbon atoms, and p is a number from 1 to 4.

19. The process of forming a polymeric dispersant additive for lubricating oils and hydrocarbon fuels, which comprises the steps of:

(a) reacting a $C_5$–$C_9$ lactone with an aminoalkyl derivative having from 2 to about 60 total carbon atoms and from 2 to about 12 nitrogen atoms at a temperature of from about 50° to about 200° C. to effect ring opening polymerization of said lactone and to form an adduct which is terminated at one end thereof with a hydroxyl group and at the other end with a nitrogen-containing heterocyclic ring, said aminoalkyl derivative being terminated at one end thereof with a primary or secondary amino group and at the other end thereof with a nitrogen-containing heterocyclic ring;

(b) forming a copolymer of ethylene and at least one $C_3$–$C_{28}$ alpha-olefin and, optionally, a non-conjugated diolefin, wherein said copolymer comprises from 2 to about 98 wt. % of ethylene moieties, from 2 to about 98 wt. % alpha-olefin moieties, and up to about 20 mole % of non-conjugated diolefin moieties;

(c) grafting onto the copolymer formed in step (b) from about 0.2 wt. % to about 5 wt. % of an ethylenically unsaturated carboxylic acid material, said material being selected from the group consisting of organic compounds which contain at least two carboxylic acid groups or anhydride groups or a polar group which is convertible into said carboxylic acid groups by oxidation or hydrolysis; and (d) reacting the adduct formed in step (a) with the grafted ethylene-alpha-olefin copolymer formed in step (c) at a temperature of from about 100° to about 250° C. to form a polymeric dispersant additive exhibiting improved varnish performance, the amount of said adduct being reacted in step (d) being from about 0.01 to about 10 moles of adduct per mole of grafted ethylene-alpha-olefin copolymer, said polymeric dispersant additive having a degree of polymerization of said lactone of from about 0.2 to about 100.

20. The process of claim 19, wherein said $C_3$–$C_{28}$ alpha-olefin comprises propylene; wherein said ethylenically unsaturated dicarboxylic acid material is a material selected from the group consisting of materials having the formula:

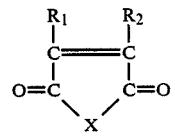

wherein $R_1$ and $R_2$ are hydrogen or a halogen, and X is oxygen, NH or $NR_3$ wherein $R_3$ is a hydrocarbyl amine or a $C_1$–$C_{40}$ alkyl group; wherein said $C_9$–$C_9$ lactone is E-caprolactone; and wherein said aminoalkyl derivative is selected from the group consisting of aminoalkyl morpholines and heterocyclic nitrogen compounds of the general formula:

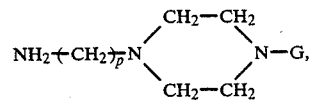

wherein G is hydrogen or an omega-aminoalkylene radical of 1 to 3 carbon atoms, and p is a number from 1 to 4.

21. A polymeric lactone derivative useful as an oil additive having improved dispersancy and formed by reacting together at a temperature of from about 100° to about 250° C.:

(a) an adduct of a $C_5$–$C_9$ lactone and an aminoalkyl derivative, and (b) a copolymer of ethylene, at least one $C_3$–$C_{28}$ alpha-olefin, and, optionally, a non-conjugated diolefin, said aminoalkyl derivative having from 2 to about 60 total carbon atoms and from 2 to about 12 nitrogen atoms and being terminated at one end thereof with a primary or secondary amino group and at the other end thereof with a tertiary amino-containing heterocyclic ring, said copolymer of ethylene having moieties derived from an ethylenically unsaturated carboxylic acid material grafted thereto, said acid material being selected from the group consisting of organic compounds which contain at least two carboxylic acid groups or anhydride groups or a polar group which is convertible into said carboxylic acid groups by oxidation or hydrolysis, and said adduct of said $C_5$–$C_9$ lactone and said aminoalkyl derivative being formed by reacting together said $C_5$–$C_9$ lactone with said aminoalkyl derivative at a temperature of from about 50° to about 200° C., said adduct being terminated at one end thereof with a hydroxyl group and at the other end with said tertiary amino-containing heterocyclic ring, and said polymeric lactone derivative having a degree of polymerization of said lactone of from about 0.2 to about 100.

22. The polymeric lactone derivative of claim 21, wherein said ethylene copolymer has a number average molecular weight of from about 700 to about 500,000; wherein there is from about 0.2 wt. % to about 5 wt. % of ethylenically unsaturated carboxylic acid derived units in the grafted ethylene-alpha olefin copolymer, wherein said non-conjugated diolefin, if present in the copolymer, is present in an amount up to about 20 mole %.

23. The polymeric lactone derivative of claim 22, wherein said $C_5$–$C_9$ lactone is E-caprolactone.

24. The polymeric lactone derivative of claim 22, wherein said $C_3$ to $C_{28}$ alpha olefin comprises propylene.

25. The polymeric lactone derivative of claim 22, wherein said ethylenically unsaturated carboxylic acid material is selected from the group of materials having the formula:

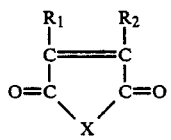

wherein $R_1$ and $R_2$ are hydrogen or a halogen, and X is oxygen, NH or $NR_3$ wherein $R_3$ is a hydrocarboxyl amine or a $C_1$–$C_{40}$ alkyl group.

26. The polymer lactone derivative of claim 22, wherein said ethylenically unsaturated carboxylic acid material is selected from the group consisting of chloromaleic anhydride, itaconic anhydride, N-hexyl maleimide, maleic anhydride, and the corresponding dicarboxylic acids thereof.

27. The polymeric lactone derivative of claim 26, wherein said ethylenically unsaturated carboxylic acid material is maleic anhydride.

28. The polymeric lactone derivative of claim 25, wherein said $C_5$–$C_9$ lactone is E-caprolactone, and wherein said ethylene copolymer is selected from the group consisting of ethylene-propylene copolymers containing from about 2 to about 98 wt. % ethylene moieties and from about 2 to about 98 wt. % propylene moieties, and ethylene-alpha-olefin-non-conjugated diolefin terpolymers containing from about 2 to about 98 wt. % ethylene, from about 2 to about 98 % of at least one $C_3$–$C_{28}$ alpha-olefin, and up to about 20 mole % of said non-conjugated diolefin, based on the total weight of ethylene and alpha-olefin moieties present.

29. The polymeric lactone derivative of claim 21, wherein said aminoalkyl derivative is selected from the group consisting of aminoalkyl morpholines and heterocyclic nitrogen compounds of the general formula:

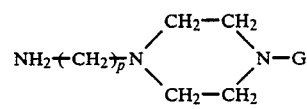

wherein G is hydrogen or an omega-aminoalkylene radical of from 1 to 3 carbon atoms, and p is a number of from 1 to 4.

30. The polymeric lactone derivative of claim 25, wherein said aminoalkyl derivative is selected from the group consisting of aminoalkyl morpholines and heterocyclic nitrogen compounds of the general formula:

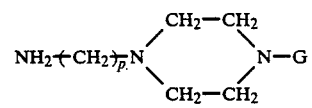

wherein G is hydrogen or an omega-aminoalkylene radical of from 1 to 3 carbon atoms, and p is a number of from 1 to 4.

31. The polymeric lactone derivative of claim 30, wherein said $C_5$–$C_9$ lactone is E-caprolactone, and wherein said ethylene copolymer is selected from the group consisting of ethylene-propylene copolymers containing from about 2 to about 98 wt. % ethylene moieties and from about 2 to about 98 wt. % propylene moieties, and ethylene-alpha-olefin-non-conjugated diolefin terpolymers containing from about 2 to about 98 wt. % ethylene, from about 2 to about 98 % of at least one $C_3$–$C_{28}$ alpha-olefin, and up to about 20 mole % of said non-conjugated diolefin, based on the total weight of ethylene and alpha-olefin moieties present.

32. The polymeric lactone derivative of claim 25, wherein said adduct of said $C_5$–$C_9$ lactone and said aminoalkyl derivative contains an ester sequence between said terminal hydroxyl group and said terminal heterocyclic ring.

33. The polymeric lactone derivative of claim 29, wherein said adduct of said $C_5$–$C_9$ lactone and said aminoalkyl derivative contains an ester sequence between said terminal hydroxyl group and said terminal heterocyclic ring.

34. The polymeric lactone derivative of claim 28, wherein said adduct of said $C_5$–$C_9$ lactone and said aminoalkyl derivative contains an ester sequence between said terminal hydroxyl group and said terminal heterocyclic ring.

35. The polymeric lactone derivative of claim 33, wherein said $C_5$–$C_9$ lactone is E-caprolactone wherein said aminoalkyl derivative is an N-aminoalkyl morpholine having from 1 to about 10 carbon atoms in the alkyl group.

36. An oil soluble dispersant useful as an oil additive, comprising the product of a reaction mixture comprising:
(I) an ethylene-$C_3$ to $C_{28}$ alpha-olefin copolymer or an ethylene-$C_3$ to $C_{28}$ alpha-olefin-non-conjugated diolefin terpolymer, wherein said copolymer or terpolymer contains from about 2.0 to about 5 wt. % of ethylenically unsaturated carboxylic acid material-derived units grafted thereto, said unsaturated carboxylic acid material being selected from the group consisting of organic compounds which contain at least two carboxylic acid groups or anhydride groups or a polar group which is convertible into said carboxylic acid groups by oxidation or hydrolysis, and (II) a $C_5$–$C_9$ lactone adduct having a hydroxyl group on one end thereof and an N-heterocyclic ring on the other end thereof, wherein said adduct was formed by reacting at a temperature of from about 50° to about 200° C. (a) a $C_5$–$C_9$ lactone with (b) an aminoalkyl derivative having a terminal primary or secondary amino group on one end thereof and said N-heterocyclic ring of the other end thereof, said adduct having a degree of polymerization of said lactone of from about 0.2 to about 100, and said aminoalkyl derivative having from 2 to about 60 total carbon atoms and from 2 to about 12 nitrogen atoms, wherein said product of said reaction mixture is prepared by reacting components (I) and (II) at a temperature of about 100° to about 250° C.

37. An oil soluble dispersant according to claim 36, wherein said $C_5$–$C_9$ lactone is caprolactone and said dispersant contains the unit

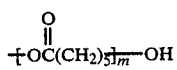

wherein m is from about 0.2 to about 50.

38. An oil soluble dispersant according to claim 37, wherein said aminoalkyl derivative is selected from the group consisting of aminoalkyl morpholines and heterocyclic nitrogen compounds of the general formula:

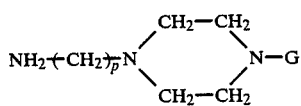

wherein G is hydrogen or an omega-aminoalkylene radical of from 1 to 3 carbon atoms, and p is a number of from 1 to 4.

39. An oil soluble dispersant according to claim 38, wherein said ethylenically unsaturated carboxylic acid material is selected from the group consisting of materials having the formula:

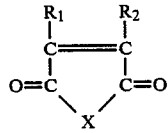

wherein $R_1$ and $R_2$ are hydrogen or a halogen, and X is oxygen, NH or $NR_3$ wherein $R_3$ is a hydrocarboxyl amine or a $C_1$–$C_{40}$ alkyl group.

40. An oil soluble reaction product useful as an oil additive having varnish performance of:

(a) polymer consisting essentially of an ethylene-$C_3$ to $C_{28}$ alpha-olefin backbone or an ethlyene-$C_3$ to $C_8$ alpha-olefin-non-conjugated diolefin backbone, said backbone having a number average molecular weight of about 700 to about 500,000 and having grafted thereto from about 0.2 to about 5 wt. % of ethylenically unsaturated carboxylic acid material units, based on the weight of the grafted polymer, said carboxylic acid material being selected from the group consisting of organic compounds which contain at least two carboxylic acid groups or anhydride groups or a polar group which is convertible into said carboxylic acid groups by oxidation or hydrolysis, (b) an aminoalkyl derivative selected from the group consisting of aminoalkyl morpholines and heterocyclic nitrogen compounds of the general formula:

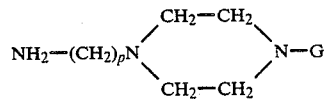

wherein G is hydrogen or an omega-aminoalkylene radical of from 1 to 3 carbon atoms, and p is a number of from 1 to 4, and, (c) a $C_5$–$C_9$ lactone, wherein (b) is first reacted with (c) at a temperature of from about 50° to about 200° C. to form an adduct which is terminated on one end thereof with a hydroxyl group and on the other end thereof with a nitrogen-containing heterocyclic ring, wherein said adduct is then reacted with (a) at a temperature of from about 100° to about 250° C. to form said oil soluble reaction product, and wherein the degree of polymerization of said $C_5$–$C_9$ lactone in said adduct is from about 0.2 to about 100.

41. An oil soluble reaction product according to claim 40, wherein said $C_5$–$C_9$ lactone is caprolactone.

42. An oil soluble reaction product according to claim 41, wherein (a) is an ethylene-propylene copolymer which has been grafted with succinic anhydride moieties.

43. An oil soluble reaction product according to claim 40, wherein (c) is E-caprolactone and wherein the degree of polymerization of said E-caprolactone in said adduct is from about 0.5 to about 20.

* * * * *